Oct. 27, 1936.  W. H. FARR  2,059,170
BRAKE DRUM
Filed June 3, 1932   2 Sheets—Sheet 1
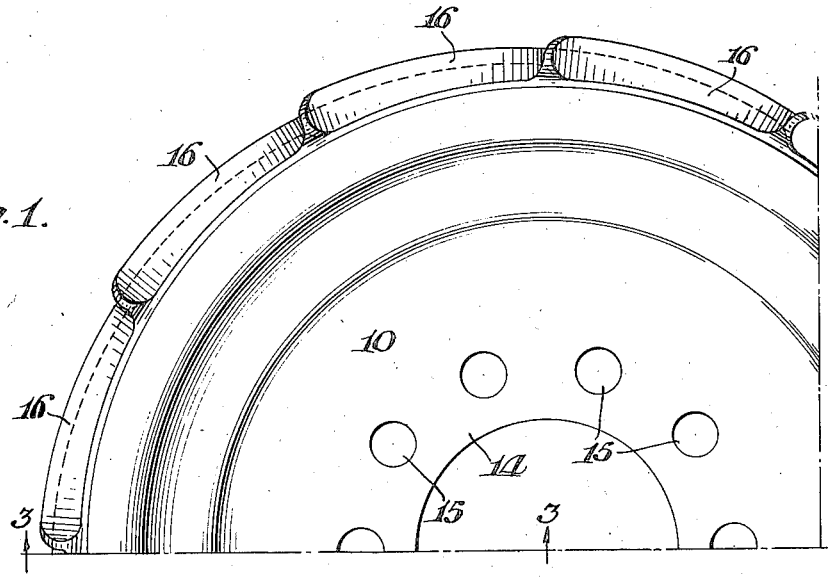
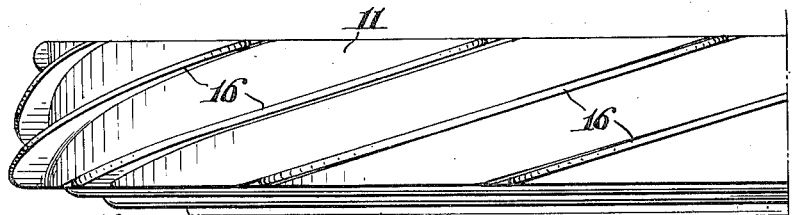
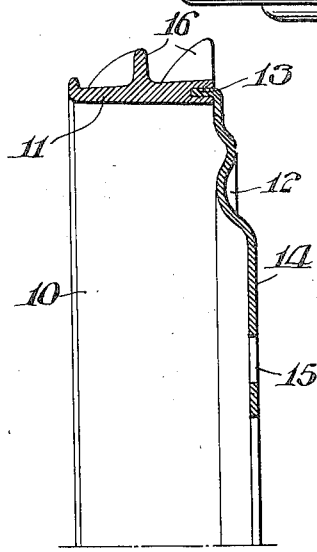
INVENTOR
Warren H. Farr,
BY
ATTORNEY Oct. 27, 1936.  W. H. FARR  2,059,170
BRAKE DRUM
Filed June 3, 1932  2 Sheets-Sheet 2

INVENTOR
Warren H. Farr,
BY
ATTORNEY

Patented Oct. 27, 1936

2,059,170

UNITED STATES PATENT OFFICE 2,059,170

BRAKE DRUM

Warren H. Farr, Detroit, Mich., assignor to Budd Wheel Company, Philadelphia, Pa., a corporation of Pennsylvania Application June 3, 1932, Serial No. 615,175

6 Claims. (Cl. 301—6)

The invention relates to vehicle wheels and brakes, and particularly to methods of cooling and strengthening brake drums.

With modern road speeds becoming higher and necessitating braking of vehicles from high speeds, several difficulties have been encountered, particularly in adequately cooling brake drums. The higher peripheral speeds of the brake drums, wearing against the brake linings, and the heat developed by high speed stops, cause the brake drums to become distorted and unequally expanded. Inefficient braking is the most usual result of this phenomenon. Efforts have been particularly directed to the adequate cooling of brake drums in order that the heat generated in drums may be dissipated. My efforts have been primarily directed to improvements in brake drum design in an effort to correct the conditions which have existed and thereby make brakes more efficient in use.

The chief object of my invention is the provision of cooling means whereby the brake drum will tend to keep its normal shape throughout all ranges of temperature. An incidental object is the improvement in the manufacture of such drums. A still further object is the strengthening and improved design of brake drums.

Broadly, the objects of my invention have been attained by providing angularly extending ribs adjacent the braking portions of drums, by making these ribs of decreasing height, and by improvements in wheel and drum design.

Other objects and advantages of my invention will be apparent after a reading of the sub-joined specification in light of the attached drawings, in which Figure 1 is a partial elevational view of my brake drum.

Fig. 2 is a plan view of the drum shown in Figure 1.

Fig. 3 is a cross sectional view taken on line 3—3 of Figure 1.

Figure 4:
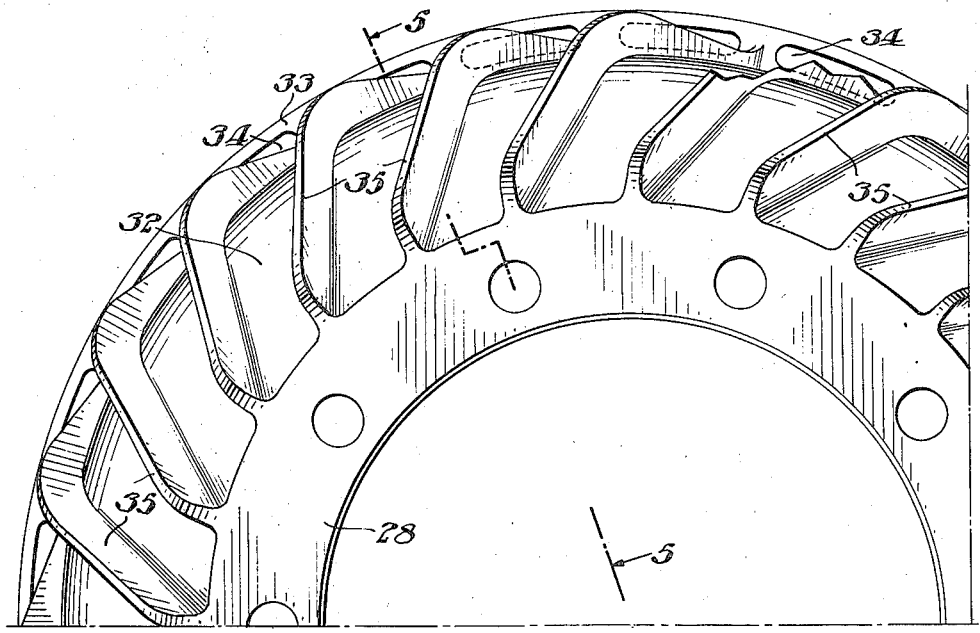
Fig. 4 is a partial elevational view of a modified form of my invention.

Referring to the drawings by reference numerals and particularly to Figures 1 to 3, brake drum 10 is comprised of a cast metal braking ring 11 and a pressed metal mounting plate 12. In the preferred form of my invention, mounting plate 12 is provided with an axially extending peripheral flange 13 which is imbedded in braking ring 11, adjacent an axial edge thereof.

Mounting plate 12 is additionally provided with a radially extending portion 14 having holes 15, through which the brake drum, as a whole, is mounted on the usual wheel hub, not shown. According to my invention I provide a series of radially extending ribs 16 on the exterior surface of braking ring 11, which ribs extend angularly across the braking ring, in a spiral formation. These ribs are preferably of decreasing height toward the open end of braking ring 11, for a purpose later to be explained.

The brake drum described above is preferably fabricated by casting the braking ring 11 in a permanent mold by the centrifugal casting process. The flange 13 of mounting plate 12 is inserted in the mold before the casting step, and the molten metal flows about this flange, bonding therewith, and affording an extremely simple yet secure joinder between the two members. In cases where annular ribs are provided on the exterior of braking ring 11 the permanent mold process cannot be used satisfactorily because it is difficult to remove the finished ring axially from the mold. By providing spiral ribs 16, extending transversely of the braking ring 11, I am able to use the permanent mold process. The ribs form, in effect, threads on the braking ring, and, as a consequence, the braking ring may be removed from the mold by rotating it relative thereto, virtually unscrewing it from the mold. This provision is materially aided by the fact that the ribs are of decreasing height toward the open end of the ring, or, in other words, toward the inside of the mold. It has been found in practice that it is merely necessary to lightly tap the casting to loosen it from the mold, and then unscrew it outwardly. The advantages of the permanent mold process are well known, and by my invention, the ribbed brake drum may be made by such a process.

The spiral ribs on braking ring 11 tend to force air currents axially across the braking surface, thus conveying heat away from the brake drum. It will be seen that the ribs will be inclined toward the outside of the vehicle wheel in the proper relation in order to draw in cool air as the vehicle moves forwardly. Further, the spiral arrangement of ribs 16 provides additional rib surfaces for radiation. This factor is very important in connection with the cooling of the drum and the maintenance thereof in a truly cylindrical contour, thus increasing the effectiveness of the drum. In addition to the above advantages, ribs 16 strengthen the drum ring 11 in much the same way as do the webs of a channel member.

Figure 5:
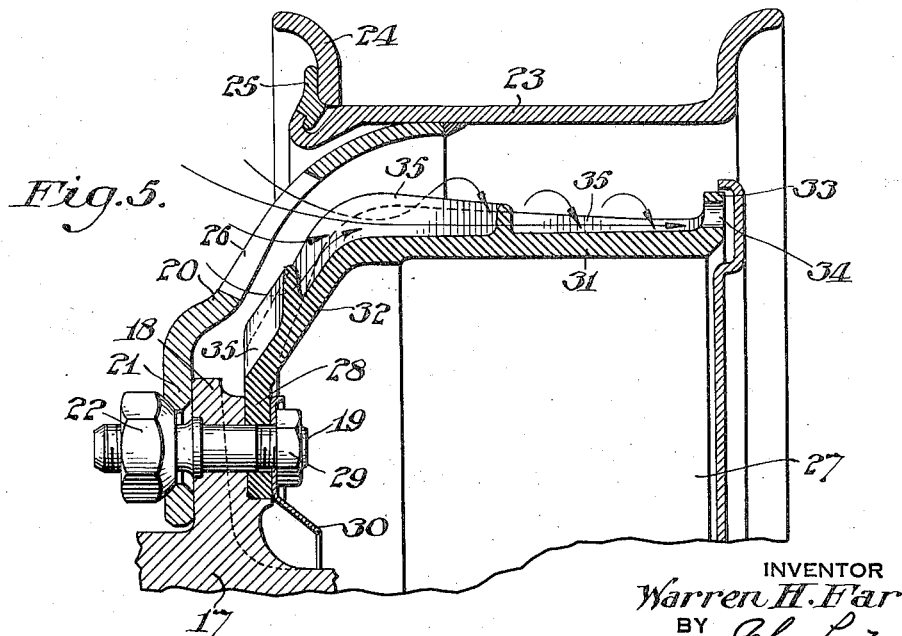
Fig. 5 is a detailed cross sectional view showing a vehicle wheel embodying my invention, the section being taken on line 5—5 of Figure 4.

In the modification shown in Figures 4 and 5, hub 17 is provided with a radially extending flange 18 having an annular series of axially extending studs 19. Wheel body 20, preferably in the form of a disc, is provided with a radially extending portion 21 adapted to be secured to the front face of flange 18 and securing studs 19 by a series of cap nuts 22. The usual wheel rim 23 and retaining rings 24 and 25 are shown. An annular series of equally spaced holes 26 are provided in the body portion of the wheel 20.

At the rear face of hub flange 18, brake drum 27 is mounted through a radially extending portion 28 thereof, by means of jam nuts 29, which also secure the usual oil slinger 30. Drum 27, preferably of the cast type, is provided with an axially extending braking portion 31, and a conical interconnection portion 32. A braking portion 31 terminates at the open end of the drum in a radially extending marginal flange 33 through which apertures 34 are provided.

Ribs 35, like ribs 16 in the other figures, are provided on the exterior surface of the braking portion 31 and the interconnecting portion 32 of drum 27. These ribs are preferably continuous, and as heretofore described are decreasing in height toward the open end of the drum. It will be seen that as the wheel rotates during forward movement of the vehicle the ribs 35 draw air through holes 26 in the wheel body forcing these cooling currents laterally across the exterior surface of braking portion 31, and finally through apertures 34 in marginal flange 33 and thence outwardly past rim 23. As heretofore mentioned, the cooling effect provided by these ribs is not only characterized by the air currents which are induced thereby, but also by the increased amount of radiation surface afforded.

It has been found that brake drums constructed in accordance with those shown in the various figures of the drawings have materially increased the efficiency and service life of vehicle brakes. A hitherto unknown degree of strength has been attained with a minimum of weight, primarily by virtue of the spiral ribs incorporated in the various figures. The drums have been found to maintain their true cylindrical form under the most severe braking conditions.

It will be seen that the objects of my invention have been attained in full. Cooling, radiation, and strength have been afforded by the provision of the spiral ribs on the braking portions of the various drums, and the manufacture of the drums has been simplified thereby. The decreasing height of the ribs toward the free edge of the drum not only facilitates the spiral draw of the casting from the mold by immediately releasing the edges of the ribs from the mold, but also prevents undue pocketing of the air at the free edge of the drum between the ribs, decreases the resistance to air circulation, and improves the general cooling.

I am aware that many modifications of my invention may be made without departing from the spirit thereof, and I do not wish to be limited to the circumstantial terminology of the specifications but rather solely by the scope of the appended claims.

What I claim is:—

1. A brake drum having a braking portion and a mounting portion, said drum being open at the end opposite said mounting portion, and having ribs across said braking portion, said ribs decreasing in height toward said open end.

2. A brake drum having a braking portion and a mounting portion, said drum being open at the end opposite said mounting portion, and having spiral ribs across said braking portion, said ribs decreasing in height toward said open end.

3. A composite brake drum comprising, in combination, a cast braking ring, and a pressed metal mounting plate, said braking ring having ribs on a surface thereof, said ribs extending angularly across said surface, and decreasing in height away from said mounting plate.

4. In a brake drum having a braking portion, a mounting portion and an interconnecting portion, and an open end away from the mounting portion, ribs extending angularly across said interconnecting portion and said braking portion and being of decreasing radial extent throughout the braking portion toward the open end of the drum.

5. A brake drum having a braking portion and a mounting portion, said drum being open at the end opposite said mounting portion, and having a marginal flange adjacent said open end, and having ribs across said braking portion, said ribs decreasing in height toward said open end, said marginal flange being perforated whereby to continue the flow of air induced by said spiral ribs.

6. In a combined apertured disk-wheel, wheel rim and cylindrical brake drum, in which the rim overlies the drum in substantially parallel spaced relation, the combination of angularly extending ribs on the outer peripheral surface of the drum arranged to induce a flow of air through the wheel apertures across the drum surface, said ribs extending through the space between the rim and the drum in decreasing radial extent toward the axially inner end of the space between the rim and drum to form, with the apertures in the wheel-disk and the adjacent surfaces of the rim and drum, an air passage of increasing cross section from the apertures in the wheel-disk to the axially inner end of the space between the rim and drum.

WARREN H. FARR.